United States Patent
Hansen

(10) Patent No.: US 9,054,616 B2
(45) Date of Patent: Jun. 9, 2015

(54) ASSEMBLY COMPRISING A MOVABLE AND BRAKABLE/DAMPABLE PART AND A METHOD FOR BRAKING A MOVABLE PART

(75) Inventor: Lars Theil Hansen, Hoersholm (DK)

(73) Assignee: Thrane & Thrane A/S, Lyngby (DK)

( * ) Notice: Subject to any disclaimer, the term of this patent is extended or adjusted under 35 U.S.C. 154(b) by 152 days.

(21) Appl. No.: 13/819,621

(22) PCT Filed: Aug. 31, 2011

(86) PCT No.: PCT/EP2011/064983
§ 371 (c)(1),
(2), (4) Date: Feb. 27, 2013

(87) PCT Pub. No.: WO2012/028642
PCT Pub. Date: Mar. 8, 2012

(65) Prior Publication Data
US 2013/0154525 A1    Jun. 20, 2013

Related U.S. Application Data

(60) Provisional application No. 61/379,766, filed on Sep. 3, 2010.

(51) Int. Cl.
*H02P 3/22* (2006.01)
*H01Q 3/08* (2006.01)

(52) U.S. Cl.
CPC ... *H02P 3/22* (2013.01); *H01Q 3/08* (2013.01)

(58) Field of Classification Search
USPC .......................................... 318/362, 375, 379
See application file for complete search history.

(56) References Cited

U.S. PATENT DOCUMENTS

| 4,761,593 | A | * | 8/1988 | Nakase | ........................ 318/473 |
| 5,155,496 | A | * | 10/1992 | Suga | .............................. 343/903 |
| 5,394,069 | A |  | 2/1995 | Danielson et al. | |
| 5,497,057 | A |  | 3/1996 | Danielson et al. | |
| 5,814,956 | A |  | 9/1998 | Kono et al. | |

(Continued)

FOREIGN PATENT DOCUMENTS

| DE | 102007059492 A1 | 6/2009 |
| EP | 0588234 A2 | 3/1994 |

(Continued)

OTHER PUBLICATIONS

International Search Report PCT/ISA/210 for PCT/EP2011/064983 dated Sep. 30, 2011.
"The Search for Intelligent Brakes", Power Transmission Engineering, Oct. 1, 2007, pp. 34-36, XP55007923.

*Primary Examiner* — Kawing Chan
(74) *Attorney, Agent, or Firm* — Harness, Dickey & Pierce, P.L.C.

(57) ABSTRACT

An assembly comprising a movable element being movable in relation to a base, a first electric motor for moving the element in relation to the base, the motor having one or more first windings each having at least two inputs, a first braking element being adapted to determine whether power and/or signals are provided to the first motor and being adapted to alter between at least two modes wherein, in a first of the modes, no power/signals is/are provided to the first motor and a first galvanic connection is provided between the inputs of at least one of the first windings and a first element having a predetermined resistance and wherein in a second of the modes, power/signals is/are provided to the first motor and the first galvanic connection is disconnected.

8 Claims, 1 Drawing Sheet

(56) References Cited

U.S. PATENT DOCUMENTS

| | | |
|---|---|---|
| 5,969,303 A | 10/1999 | Piserchia et al. |
| 2010/0288067 A1 | 11/2010 | Hofmann et al. |

FOREIGN PATENT DOCUMENTS

| | | |
|---|---|---|
| GB | 776937 A | 6/1957 |
| GB | 2335552 A | 9/1999 |

* cited by examiner

ASSEMBLY COMPRISING A MOVABLE AND BRAKABLE/DAMPABLE PART AND A METHOD FOR BRAKING A MOVABLE PART

This application is the national phase under 35 U.S.C. §371 of PCT International Application No. PCT/EP2011/064983 which has an International filing date of Aug. 31, 2011, which designated the United States of America and which claims priority to U.S. Provisional patent application No. 61/379,766 filed Sep. 3, 2010.

FIELD OF THE INVENTION

The present invention relates to an assembly having a movable part which may be braked, if an electric motor moving the movable part looses power, such as during transport of the assembly. In particular, the invention relates to assemblies having multiple movable parts and multiple electrical motors moving these parts.

In many instances, movable parts are not freely movable but have end stops preventing the movable part from impacting or hitting other elements of the assembly. However, hitting such end stops may also have a detrimental effect on the assembly, whereby it is desired to instead brake any movement of the movable part.

Such braking may be performed using additional means, such as manually operated locks or electrically operated locks (such as using solenoids). However, such locks add to the price and weight.

SUMMARY

The present invention relates to the use of the actual electrical motor for performing the braking of the movement in situations where the motor is not operated or operatable.

In a first aspect, the invention relates to an assembly comprising:
- a movable element being movable in relation to a base,
- a first electric motor for moving the element in relation to the base, the motor having one or more first windings each having at least two inputs,
- a first braking element being adapted to determine whether power and/or signals are provided to the first motor and being adapted to alter between at least two modes wherein:
  - in a first of the modes, no power/signals is/are provided to the first motor and a first galvanic connection is provided between the inputs of at least one of the first windings and a first element having a predetermined resistance and
  - in a second of the modes, power/signals is/are provided to the first motor and the first galvanic connection is disconnected.

In this respect, a movable element may be translatable, rotatable or otherwise movable in relation to the base. Naturally, a combination of such movements may be performed. As will be described below, usually, one motor performs a simple operation (translation or rotation) of the movement, but multiple motors may be used for performing more complex movements of the movable element.

In this context, an electric motor may be any electrically driven motor, such as an AC motor, a DC motor, a stepper motor, brushed motors, brush-less motors or the like. Such motors usually have one or more windings each having at least two inputs. Normally, providing power or a signal to the winding(s) will operate the motor and thus rotate a shaft thereof if present. Many of the above-mentioned motor types have permanent magnets therein, and others require additional electrical components, such as capacitors, in order to perform the braking when the resistance is provided between the inputs of one or more windings. These requirements are known to the skilled person.

When a motor is operated, it receives power and/or signals. If no power/signals is/are received, the motor by itself provides no large resistance to movement of the movable part, unless the below resistance is applied.

Naturally, when the first braking element determines whether power and/or signals are provided to the first motor, it is preferably determined whether the motor receives the power/signals required to operate the motor and thus provide a resistance to movement of the movable part, if the motor is not correspondingly operated. Thus, if a predetermined voltage or current is required to have the motor move the movable part, a lower voltage or current may be applied, but the braking means will still go to the first mode.

Any number of modes may exist, such as modes wherein no power/signals is/are provided and no resistance is used, such as when it is desired that the movable part is movable, such as by an operator, to obtain a predetermined position, while training the system or the like.

In the first mode, a resistance is provided between the inputs (usually the ends of a conductor forming the coil) of the coil, so that rotation of a motor shaft will meet a rotation resistance (similar to friction) of a size or quantity defined by the motor, gearing between the motor shaft and rotatable part, etc. Also, depending on the motor type, the output thereof when rotating the shaft while the braking element is in the first mode may be pulses, whereby the resistance may be adapted to be frequency dependent (using capacitors or impedances), so as to adapt the resistance to the rotation velocity or angular velocity of e.g. a motor shaft.

Naturally, the resistance provided may be an ohmic resistance, an impedance, an imaginary resistance, a conductor, a coil, a capacitor, or any combination thereof. The skilled person will be able to tailor the first element to meet requirements as to what force is to be resisted etc.

Also, the first element may be tailored to handle the power (current and voltage) generated by the motor when rotated.

In the second mode of the braking element, the first galvanic connection is disconnected, and the motor may be controlled and operated as desired to move the movable part.

In one embodiment, the assembly further comprises a driving apparatus and a second galvanic connection between the driving apparatus and the first motor, the driving apparatus being adapted to provide the power and/or controlling signals to the motor and wherein, in the first mode, the second galvanic connection is disconnected and, in the second mode, the second galvanic connection is provided. In this connection, the power/signals is/are adapted to or suitable for having the motor operate and move the movable part.

When braking the movable part by braking the motor, energy will be provided in the winding(s). This is to be dissipated in the resistance, and the breaking of the second galvanic connection may be performed to protect the driving apparatus from this energy.

Naturally, the driving apparatus may be controlled by instructions defining desired movement of the moving part, such as if the moving part is a robotic element, a movable antenna or the like.

In that or another embodiment, the assembly further comprises:
- a second electric motor for moving the element in relation to the base, the second motor having one or more second windings each having at least two inputs, and a second braking element being adapted to determine whether power and/or signals are provided to the second motor and being adapted to alter between at least two modes wherein:
  in the first mode, no power/signals is/are provided to the second motor and a third galvanic connection is provided between the inputs of at least one of the second windings and a second element having a predetermined resistance and
  in a second of the modes, power/signals is/are provided to the second motor and the third galvanic connection is disconnected.

When providing multiple motors, the movable element may be moved along more complex trajectories, such as around or along multiple axes. Usually, a motor is used for controlling movement around or along a single axis. Thus, when multiple motors are provided, each motor may be provided with its own braking element.

In one situation, the individual braking elements operate totally independently of each other. In another situation, the assembly further comprises a controlling element adapted to determine if a braking element is in the first mode and, if so, bring at least one other braking element into its first mode. Thus, the controlling element is adapted to have one braking element operate to brake the motor, even though this particular motor receives the power/signals. This may be useful in the situation where the movement controlled by the braked motor could cause damage to the movable element or other elements if the movable element is allowed to be moved by the still operating other motor. When multiple motors move a movable element, illegal or undesired positions or movements may occur where the movement or positions defined by the motors at certain instances is/are undesired or harmful. Thus, if one motor is braked at a certain position, for example, certain positions or movements of the other motor may be undesired or illegal, whereby it may be best to brake the other motor in order to ensure that no such position or movement is encountered.

In fact, it may be desired that the controlling element is adapted to, before bringing the other braking element into its first mode, operate the motor pertaining to the other braking element to a predetermined position. This predetermined position may be determined on the basis of a position of the movable element or the braked motor, such that the overall movement or position of the movable element is not unsuitable or undesired.

In another situation, no power may be provided to the assembly at all, such as when transporting the assembly. In that situation, it may be desired that the braking element(s) is monostable in the first mode so that this mode is always chosen, if no power is provided to the braking element. Thus, during transport, all motors are preferably braked, so that the movable element is protected from undesired impacts etc. by moving during transportation. When receiving power, and when the motor receives power/signals, the braking element can go to the second mode and thus generally allow movement of the motor.

Even though the present assembly may be any type of assembly having a movable element moved by one or more motors, a presently preferred embodiment is one wherein the movable element is an antenna. The movement of the antenna may be rotation along or around one or more axes in order to obtain or maintain a desired direction of the antenna.

Another aspect of the invention relates to a method of operating an assembly comprising:

moving an element relation to a base using a first electric motor having one or more first windings each having at least two inputs,
  a first braking element being adapted to determine whether power and/or signals are provided to the first motor and being adapted to alter between at least two modes wherein:
    in a first of the modes, no power/signals is/are provided to the first motor and a first galvanic connection is provided between the inputs of at least one of the first windings and a first element having a predetermined resistance and
    in a second of the modes, power/signals is/are provided to the first motor and the first galvanic connection is disconnected.

In one embodiment, the moving step comprises a driving apparatus providing the power and/or controlling signals to the motor via a second galvanic connection, and wherein, in the first mode, the second galvanic connection is disconnected and, in the second mode, the second galvanic connection is provided.

In that or another situation, the moving step comprises moving the element in relation to the base also using a second electric motor having one or more second windings each having at least two inputs, the method comprising the further step of a second braking element being adapted to determine whether power and/or signals are provided to the second motor and being adapted to alter between at least two modes wherein:
  in a first of the modes, no power/signals is/are provided to the second motor and a third galvanic connection is provided between the inputs of at least one of the second windings and a second element having a predetermined resistance and
  in a second of the modes, power/signals is/are provided to the second motor and the third galvanic connection is disconnected.

In that embodiment, the method may further comprise the step of determining if a braking element is in the first mode and, if so, bringing at least one other braking element into its first mode. Then, the determining step may comprise, before bringing the other braking element into its first mode, operating the motor pertaining to the other braking element to a predetermined position.

In a preferred embodiment, the method further comprises using the movable element as an antenna.

BRIEF DESCRIPTION OF THE DRAWINGS

In the following, preferred embodiments of the invention will be described with reference to the drawing, wherein.

DESCRIPTION OF EXAMPLE EMBODIMENTS

Figure 1:
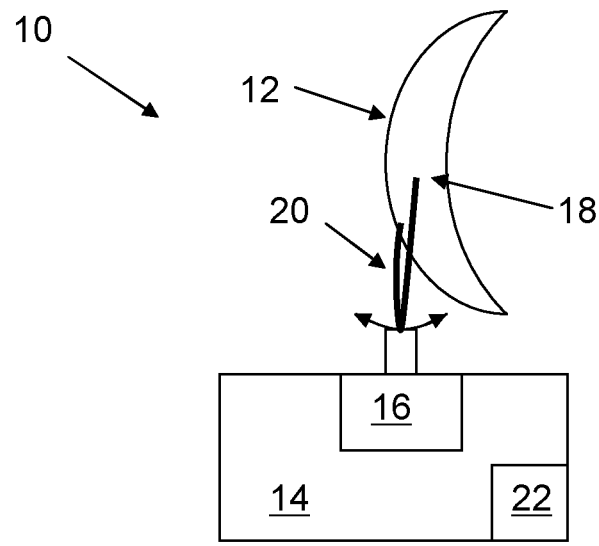
FIG. 1 illustrates a first embodiment according to the invention and
FIG. 2 illustrates a second embodiment according to the invention.

In FIG. 1, an embodiment is seen in which the apparatus 10 is an antenna comprising an antenna disc 12 and a base 14 to which the antenna is coupled in a rotatable manner.

More particularly, the disc 12 is rotatable in relation to a base 14 and via a yoke 20 around two aces using a motor 16 for so-called azimuth rotation (usually around a vertical axis) of the disc 12 and a motor 18 for so-called elevation rotation (usually around a horizontal axis) of the disc 12.

The motors 16 and 18 are electrical motors, such as AC or DC motors. DC engines, such as permanent magnet motors, are directly useable, whereby AC motors may require the standard use of capacitors in order to render these useful also for braking according to the invention.

During operation, the motors 16 and 18 are controlled by a controller 20 which transmits power and/or controlling signals to the motors 16/18 in order to have the disc 12 directed in a desired direction. As antennae of this type may be used on moving vehicles, vessels, airplanes or the like or for communicating with moving targets, such as airplanes, satellites or the like, the direction of the disc 12 in relation to the base 14 may vary constantly or intermittently.

Usually, the disc 12 is also rotatable in a plane perpendicular to that of the elevational rotation—the so-called cross elevational rotation. The motor used for this rotation is not illustrated, but it will operate in the same manner as motor 18.

Especially the elevational rotation may have end stops in order to avoid the disc 12 impacting on the base 14 or the yoke 20. However, impacting on the end stops may cause damage to the apparatus. Therefore, it is desired to be able to stop or brake the movement of the disc 12, if control e.g. is lost over the motors 16/18.

Another situation is seen during transport, where the motors 16/18 are not energized, whereby movement of the disc 12 in relation to the base 14 is desirably prevented.

In this embodiment, the controller 22 will determine whether power is fed to the individual motor 16/18 or not. This determination may be made via a power/signal sensor or the like provided at or near the motor 16/18.

If a motor 16/18 receives no power, the controller 22 connects a predetermined resistance over one or more windings of the motor 16/18. This will break the motor 16/18 and thus movement of the disc 12 in the direction or around the axis controlled by that motor 16/18.

In one embodiment, the connecting of the resistance over the winding(s) may be a default or "power off" setting which is automatically selected or chosen, even if all power to the entire apparatus 10 is cut off.

Naturally, the breaking of the motor 16/18 will depend on the weight of the moving part, such as the disc 12, alternatively including the weight of the yoke 20, any gearing between the moving part and the engine shaft, and the resistance applied by the controller 22.

This resistance may be an ohmic resistance, an impedance, a coil, a resistor, a capacitor or even a short circuit. Naturally, combinations thereof may be used to make the resistance or braking frequency dependent and thus rotation (of the motor shaft) dependent, if desired.

The controller 22 preferably, when noticing that one motor 16/18 receives no power, also instructs one or more of the other motors 16/18 to brake any movement. This may simply be obtained by removing power thereto and connecting a resistance (the same or any other suitable resistance) to one or more of the windings of such motor(s).

As illegal or undesired positions may exist of the disc 12, any rotational position of one motor 16/18 may define an allowed range or a not-allowed range of rotational positions of another motor 16/18. Thus, if one of these motors is braked, the controller 22 may ensure, such as by controlling the other motor, that the other motor is braked in a position within the allowed range, outside the not-allowed range or at a predetermined position in which all positions of the already braked motor are allowed.

Naturally, the resistance(s) may be positioned close to or at the motor(s) 16/18 if desired, where a switch or the like, controlled by the controller 22, is positioned in the vicinity to connect and disconnect the resistance(s) when required. This switch may also, irrespective of its position, disconnect any connection from the controller 22 to the motor 16/18 when the resistance(s) is/are connected to the motor 16/18 in order to protect the controller 22 circuitry, when the motor 16/18 brakes and thus provides a current/voltage output.

In one embodiment, the switch is a monostable switch, which has its one stable condition where it connects the resistance to the winding(s). Thus, the other mode can only be chosen as long power is provided. If power is cut, the stable condition is taken, and the resistance connected so as to brake the motor.

Figure 2:
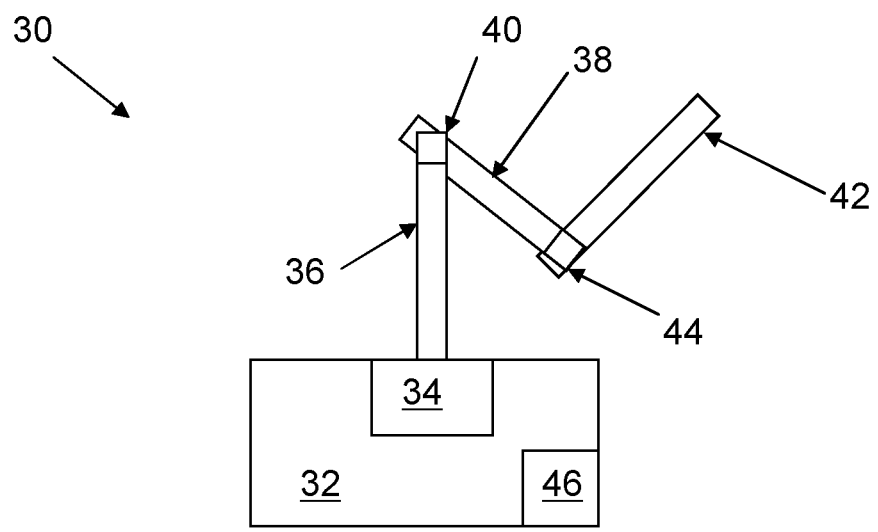

FIG. 2 illustrates the use of the present invention in relation to another type of apparatus, here in the form of a robotic arm 30 having a base 32 in relation to which a motor 34 rotates a vertical part 36 to which a first arm part 38 is rotatably connected and rotated via a motor 40. To the first arm part 38, a second arm part 42 is connected and rotated by a motor 44. The operation of the motors 34/40/44 is controlled by a controller 46 which then controls the operation of the robotic arm 30.

This embodiment is similar to that of FIG. 1 in that if one motor 34/40/44 looses power (or during transportation), the controller 46 will facilitate that a resistance is coupled to one or more windings of that motor to brake the movement of the part moved by the motor. Also, the operation of one or more of the other motors may be braked, such as after having positioned the part moved by the motor to a desired or suitable position, by the controller 46, so as to avoid illegal or undesired relative positions of the individual, movable parts 36/38/42.

The invention claimed is:

1. An assembly comprising:
a movable element being movable in relation to a base,
a first electric motor configured to move the element in relation to the base, the motor having one or more first windings each having at least two inputs,
a first braking element configured to determine whether power and/or signals are provided to the first motor and alter between at least two modes of the first braking element, wherein
in a first of the at least two modes of the first braking element, no power/signals is/are provided to the first motor and a first galvanic connection is provided between the inputs of at least one of the one or more first windings and a first element having a desired resistance, and
in a second of the at least two modes of the first braking element, power/signals is/are provided to the first motor and the first galvanic connection is disconnected,
a second electric motor configured to move the element in relation to the base, the second motor having one or more second windings each having at least two inputs, and
a second braking element configured to determine whether power and/or signals are provided to the second motor and alter between at least two modes of the second braking element, wherein
in a first mode of the at least two modes of the second braking element, no power/signals is/are provided to the second motor and a third galvanic connection is provided between the inputs of at least one of the one or more second windings and a second element having a desired resistance, and in a second mode of the at least two modes of the second braking element, power/signals is/are provided to the second motor and the third galvanic connection is disconnected, and a controlling element configured to determine if one of the first braking element and the second braking element is in a respective first mode and, if so, bring the other one of the first and second braking elements into its respective first mode.

2. An assembly according to claim 1, further comprising:
a driving apparatus and a second galvanic connection between the driving apparatus and the first electric motor, the driving apparatus being configured to provide the power and/or controlling signals to the first electric motor and wherein, in the first mode of the first braking element, the second galvanic connection is disconnected and, in the second mode of the first braking element, the second galvanic connection is provided.

3. An assembly according to claim 1, wherein the controlling element is configured to, before bringing the other braking element into its respective first mode, operate the motor pertaining to the other braking element to a desired position.

4. An assembly according to claim 1, wherein the movable element is an antenna.

5. A method of operating an assembly comprising:
moving an element relation to a base using a first electric motor and a second electric motor, the first electric motor having one or more first windings each having at least two inputs, the second electric motor having one or more second windings each having at least two inputs,
determining, by a first braking element, whether power and/or signals are provided to the first motor,
altering between at least two modes of the first braking element based on the determining, wherein
in a first of the at least two modes of the first braking element, no power/signals is/are provided to the first motor and a first galvanic connection is provided between the inputs of at least one of the one or more first windings and a first element having a desired resistance, and in a second of the at least two modes of the first braking element, power/signals is/are provided to the first motor and the first galvanic connection is disconnected, determining, by a second braking element, whether power and/or signals are provided to the second motor,
altering between at least two modes of the second braking element, wherein
in a first mode of the at least two modes of the second braking element, no power/signals is/are provided to the second motor and a third galvanic connection is provided between the inputs of at least one of the one or more second windings and a second element having a desired resistance, and
in a second mode of the at least two modes of the second braking element, power/signals is/are provided to the second motor and the third galvanic connection is disconnected, and
determining if one of the first braking element and the second braking element is in a respective first mode and, if so, bring the other one of the first and second braking elements into its respective first mode.

6. A method according to claim 5, wherein the moving comprises a driving apparatus providing the power and/or controlling signals to the first electric motor via a second galvanic connection, and wherein, in the first mode of the first braking element, the second galvanic connection is disconnected and, in the second mode of the first braking element, the second galvanic connection is provided.

7. A method according to claim 5, wherein the determining if one of the first braking element and the second braking element is in a respective first mode comprises, before bringing the other braking element into its respective first mode, operating the motor pertaining to the other braking element to a desired position.

8. A method according to claim 5, further comprising:
using the movable element as an antenna.

* * * * *